(12) United States Patent
Kato

(10) Patent No.: US 8,194,291 B2
(45) Date of Patent: Jun. 5, 2012

(54) IMAGE-READING DEVICE

(75) Inventor: Tetsuya Kato, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1100 days.

(21) Appl. No.: 11/475,035

(22) Filed: Jun. 27, 2006

(65) Prior Publication Data
US 2007/0002399 A1 Jan. 4, 2007

(30) Foreign Application Priority Data

Jun. 30, 2005 (JP) ................................. 2005-191258

(51) Int. Cl.
H04N 1/04 (2006.01)
H04K 3/00 (2006.01)
(52) U.S. Cl. ........................... 358/474; 358/482; 398/39
(58) Field of Classification Search .................. 358/486, 358/493, 509, 514, 474, 471, 482, 483; 398/39; 455/295, 1
See application file for complete search history.

(56) References Cited

U.S. PATENT DOCUMENTS

| 6,383,143 B1 * | 5/2002 | Rost | 600/534 |
| 7,676,024 B2 * | 3/2010 | Taoka et al. | 378/98.8 |
| 7,738,011 B2 * | 6/2010 | Ito | 348/211.11 |
| 2004/0032628 A1 * | 2/2004 | Sato et al. | 358/514 |
| 2004/0105135 A1 | 6/2004 | Sawada | |
| 2005/0094225 A1 | 5/2005 | Hu | |

FOREIGN PATENT DOCUMENTS

| CN | 1323080 A | 11/2001 |
| JP | 2003 298813 | 10/2003 |

OTHER PUBLICATIONS

Note on the Defintion and Calculatioin of the Per-Unit Length Internal lmepdance of a Uniform Conducting Wire by Aosheng Rong IEEE (Aug. 2007) pp. 677-681.*

Notification of Second Office Action from Patent Office of The People's Republic of China issued in corresponding Chinese Application No. 2006-10099942.5, dated Apr. 4, 2008.

Chinese Office Action (issued by State Intellectual Property Office in corresponding Chinese Patent Appl'n No. 20060099942.5) mailed Sep. 7, 2007.

* cited by examiner

Primary Examiner — Jerome Grant, II
(74) Attorney, Agent, or Firm — Baker Botts L.L.P.

(57) ABSTRACT

An image-reading device includes a linear image sensor and a cable. The linear image sensor is divided into, at least, first, second and third blocks. The first block is disposed adjacent to the second block. Each block reads images on an original document and generates image signals. The cable includes, at least, first, second and third signal wires corresponding to the first, second and third blocks respectively. Each signal wire transmits the image signals generated by each block. The third wire is sandwiched between the first signal wire and the second signal wire.

9 Claims, 8 Drawing Sheets

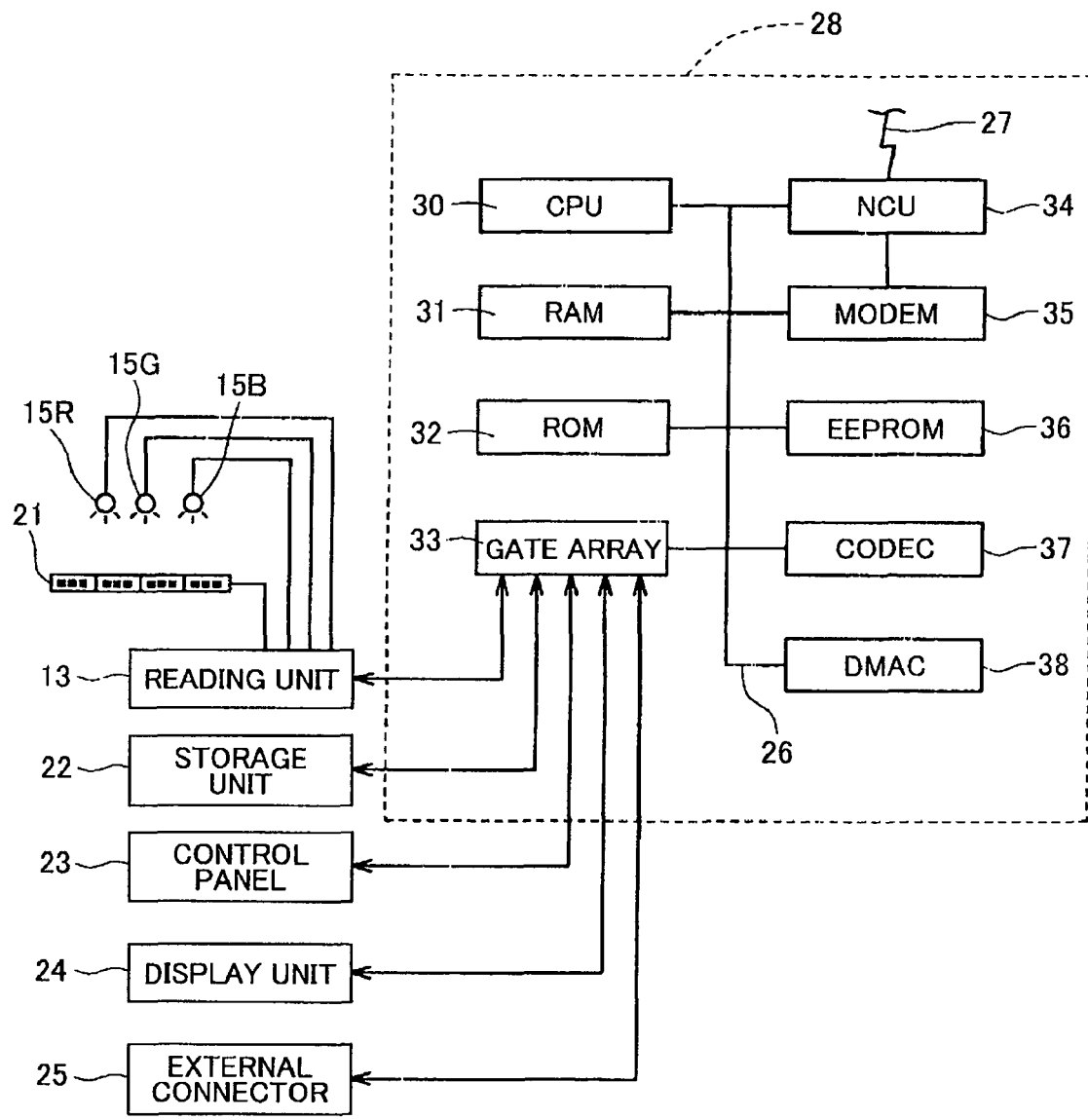

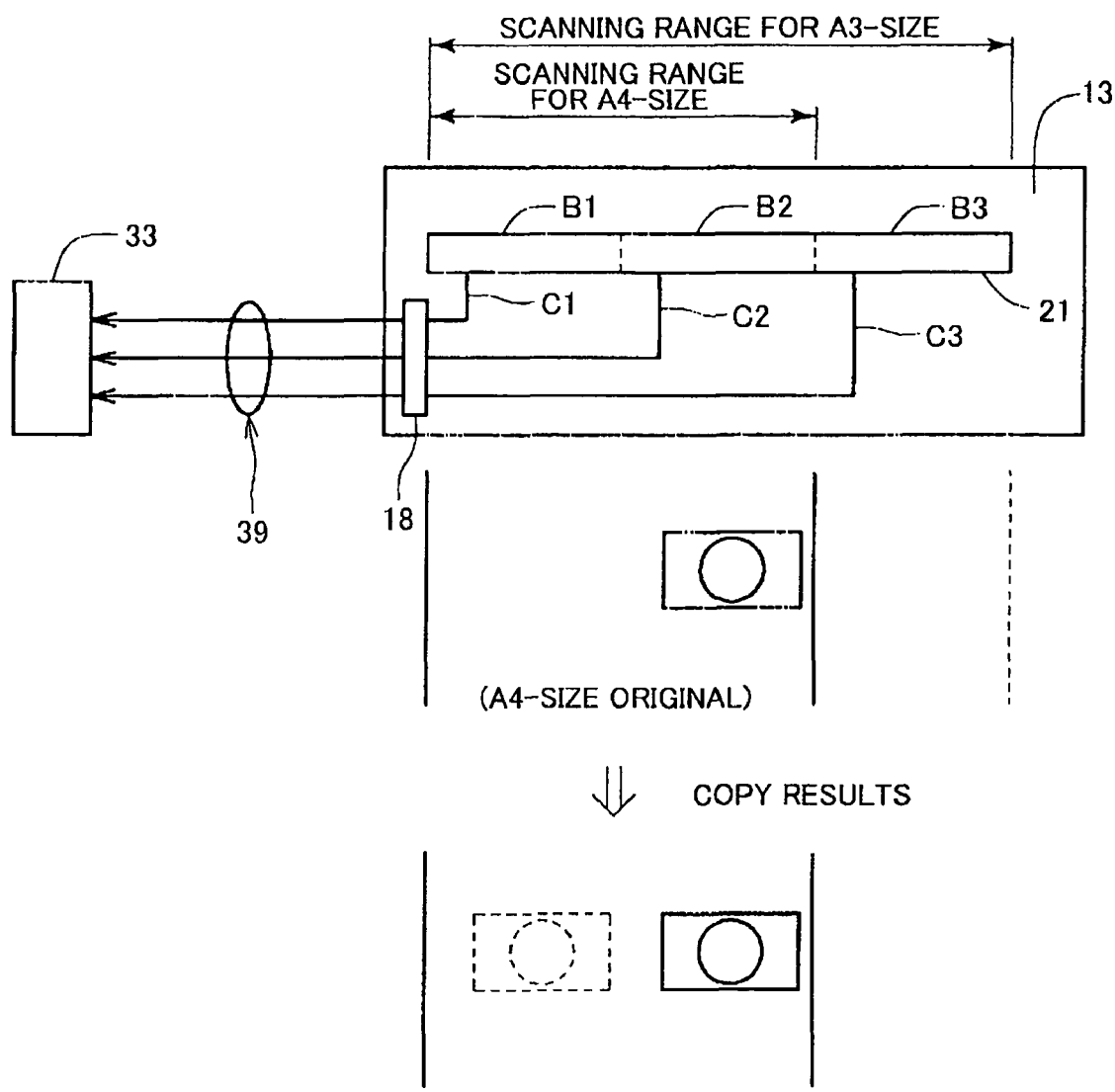

IMAGE-READING DEVICE

CROSS REFERENCE TO RELATED APPLICATIONS

This application claims priorities to Japanese Patent Application Nos. 2005-191258 filed on Jun. 30, 2005, the contents of which are hereby incorporated by reference into the present application.

TECHNICAL FIELD

The present invention relates to an image-reading device employing an image sensor having a one-dimensional array of light-receiving elements for reading an image from an original document as electronic data.

BACKGROUND

Image-reading devices and image-forming devices well known in the art include scanners, facsimile machines, copiers, and multifunction devices including a combination of these functions. These conventional devices use image sensors having a one-dimensional array of light-receiving elements for reading images from original documents as electronic data.

One such image-reading device disclosed in Japanese unexamined patent application publication No. 2003-298813 has a plurality of sensor IC chips arranged in a linear array and provided with a plurality of built-in photodetectors. The photodetectors receive light irradiated from a light source after the light is reflected off the original document, and the sensor IC chips are configured to output image signals of a level corresponding to the amount of received light as a serial analog signal.

The number of sensor IC chips is set to a natural multiple of three, and the sensor IC chips are divided into blocks of this natural multiple, with each block outputting an image signal. In this way, it is possible to provide an image reader capable of accelerating the process of reading an image and capable of reducing the cost of a device employed in processing image signals.

An example configuration of the image reader described above is shown in FIG. 8. Here, the sensor IC chips are divided into three blocks B1-B3, each having a corresponding cable or wiring pattern C1-C3 linking the blocks to a connector 18. The connector 18 is connected to an external circuit, such as a gate array 33, via a flexible flat cable 39. Accordingly, image signals outputted from the blocks B1-B3 of sensor IC chips are conveyed to the gate array 33 via the connector 18 and flexible flat cable 39.

With the configuration shown in FIG. 8, a reading unit 13 accommodating these sensor IC chips for reading images moves in a prescribed scanning direction, requiring that the flexible flat cable 39 have a length exceeding one meter so as not to restrict the reading unit 13 in its range of movement. Consequently, when reading and copying an image from a paper having the width of an A4-size sheet with blocks B1 and B2 of the sensor IC chips, stray capacitance, parasitic capacitance, common impedance in the ground, and other effects lead to cross talk between the adjacent wiring patterns C1 and C2. Since cross talk is the leakage of unnecessary signals, image data read by the original block B2, indicated by a solid line in FIG. 8, is leaked from the wiring pattern C2 to the wiring pattern C1 and is superposed in the copy results for the wiring pattern C1, indicated by the dotted line in FIG. 8, as if the image were read by the block B1.

In another method, the flexible flat cable 39 is covered with a shielded wire. However, this shielded wire increases the weight of the flexible flat cable 39 and is not very flexible, thereby hampering movement of the flexible flat cable 39 in the movable range of the reading unit 13. Further, such shielded wire is expensive and, therefore, increases the cost of the image-reading device.

SUMMARY

In view of the foregoing, it is an object of the present invention to provide an image-reading device capable of reducing the effects of cross talk during an image-reading operation.

In order to attain the above and other objects, this invention provides an image-reading device including a linear image sensor and a cable. The linear image sensor is divided into, at least, first, second and third blocks. The first block is disposed adjacent to the second block. Each block reads images on an original document and generates image signals. The cable includes, at least, first, second and third signal wires corresponding to the first, second and third blocks respectively. Each signal wire transmits the image signals generated by each block. The third wire is sandwiched between the first signal wire and the second signal wire.

BRIEF DESCRIPTION OF THE DRAWINGS

The particular features and advantages of the invention as well as other objects will become apparent from the following description taken in connection with the accompanying drawings, in which:

FIG. 3 is a block diagram showing the control structure for the multifunction device;

FIG. 8 is an explanatory diagram illustrating the structure of a conventional image-reading device.

DETAILED DESCRIPTION

Next, a preferred embodiment of the image-reading device according to the present invention will be described through the example of a multifunction device having a scanner function and facsimile function. However, the image-reading device of the present invention are not limited to the multifunction device described herein, but may be applied to a scanner, a facsimile machine, a copier, a printer, or the like.

Figure 1:
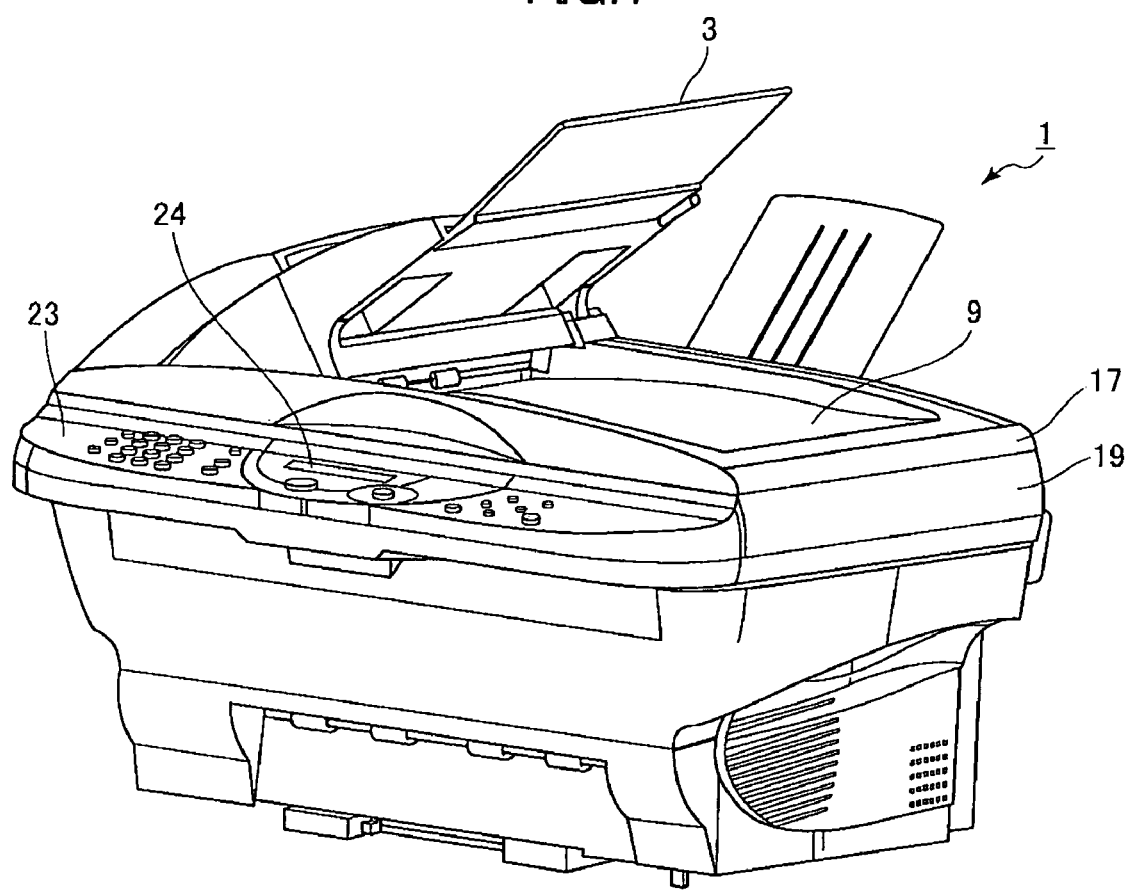
FIG. 1 is a perspective view of a multifunction device according to the preferred embodiment of the present invention.
Figure 2A:
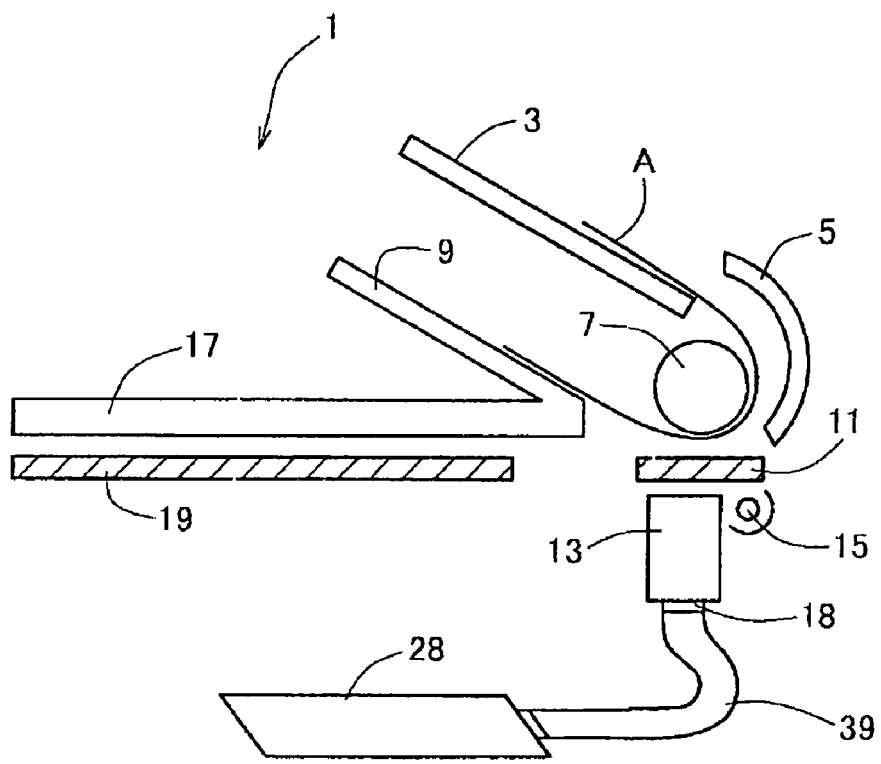
FIGS. 2A and 2B are cross-sectional views of the multifunction device in FIG. 1.
Figure 2B:
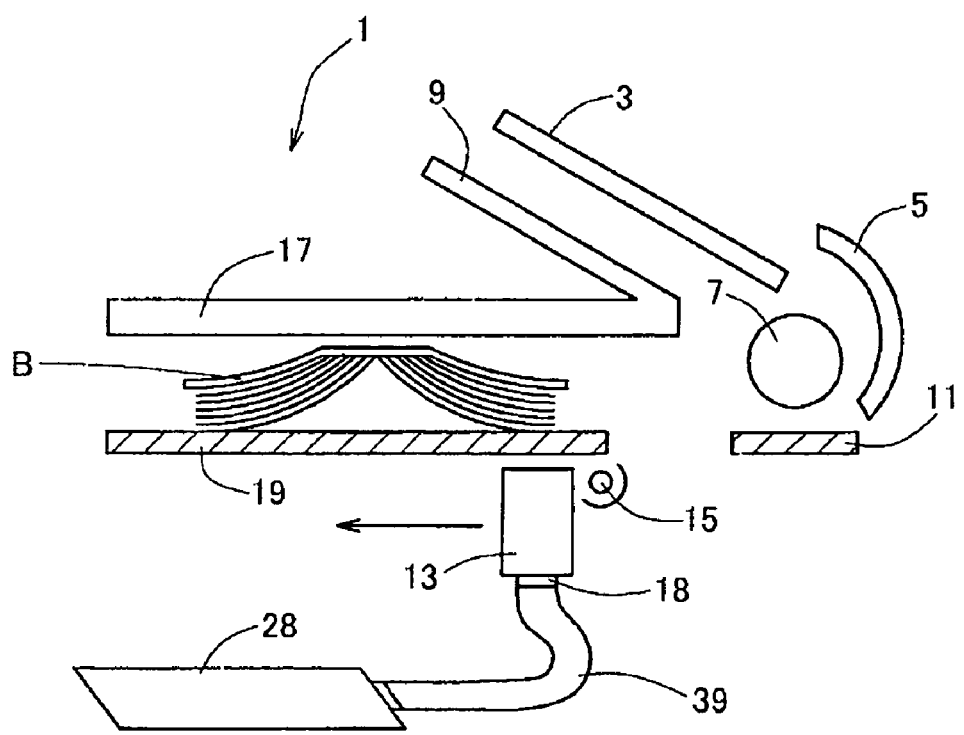

FIG. 1 is a perspective view and FIGS. 2A and 2B are cross-sectional views of a multifunction device 1 according to the preferred embodiment of the present invention. The multifunction device 1 includes an automatic document feeder (ADF) scanning mechanism and a flatbed scanning mechanism.

The ADF scanning mechanism is configured of an original-loading tray 3, for supporting an original document to be scanned; an original guide 5 for guiding the original fed from the original-loading tray 3; a feeding roller 7 for feeding sheets of the original document loaded in the original-loading tray 3 along the original guide 5; an original discharge tray 9 for receiving the original document fed by the feeding roller 7 after the document has been scanned; a contact glass 11 disposed below the feeding roller 7 on the conveying path of the original document; and a reading unit 13, having a light source 15, disposed beneath the contact glass 11 for scanning an image from the original document.

The flatbed scanning mechanism includes a glass flatbed original-supporting surface 19 for supporting an original document; a pressing plate 17 for pressing the document against the original-supporting surface 19; and the reading unit 13 and light source 15 described above.

When scanning an original using the ADF scanning mechanism illustrated in FIG. 2A, an original A is loaded on the original-loading tray 3. When a command is given to begin scanning, the feeding roller 7 begins to rotate and feeds the original A so that the original A passes over the contact glass 11. At this time, the reading unit 13 positioned below the contact glass 11 reads an image from the original A through the contact glass 11.

When scanning an original with the flatbed scanning mechanism illustrated in FIG. 2B, an original B is placed on top of the original-supporting surface 19, and the pressing plate 17 is lowered over the original B so as to press the original B against the original-supporting surface 19. When a command is given to begin scanning, the reading unit 13 begins scanning the original B while moving together with the light source 15 in the direction indicated by the arrow in FIG. 2B.

FIG. 3 is a block diagram showing a main circuit board 28 provided inside the body of the multifunction device 1. As shown in FIG. 3, the main circuit board 28 includes a CPU 30, a RAM 31, a ROM 32, a gate array 33, a network control unit (NCU) 34, a modem 35, an EEPROM 36, a codec 37, and a direct memory access controller (DMAC) 38.

The CPU 30, RAM 31, ROM 32, gate array 33, NCU 34, modem 35, EEPROM 36, codec 37, and DMAC 38 are all connected to each other via a bus line 26. The bus line 26 includes an address bus, a data bus, and control signal lines. The gate array 33 is also connected to the reading unit 13 described above, a storage unit 22, a control panel 23, a display unit 24, and an external connector 25. The NCU 34 is connected to a telephone line 27.

The CPU 30 controls the overall operations of the multifunction device 1. The NCU 34 connected to the telephone line 27 performs network control operations for connecting to and disconnecting from the telephone line, and the like. The RAM 31 serves as a line buffer memory that is used as a work area for the CPU 30 and an area for developing the scanned image. The modem 35 modulates and demodulates facsimile data and the like. The ROM 32 stores such data as programs executed by the CPU 30 and various settings. The EEPROM 36 stores various flags, settings, and the like. The gate array 33 functions as an input/output interface between various components, such as the CPU 30 and reading unit 13. The codec 37 encodes and decodes facsimile data. The DMAC 38 primarily reads data from and writes data to the RAM 31.

The storage unit 22 is a laser printer or the like that functions to record images on recording paper. The control panel 23 includes various buttons that the user presses to transmit corresponding operating signals to the CPU 30. The display unit 24 includes a liquid crystal display (LCD) and the like for displaying the operating state of the multifunction device 1 and other information. The external connector 25 functions to connect an external device, such as a personal computer, to the multifunction device 1.

The reading unit 13 includes a linear image sensor 21 having a plurality of sensor IC chips 2 (see FIG. 4), and the light source 15 described above. The reading unit 13 functions to read an image from an original or other input sheet. The light source 15 includes light sources 15R, 15G, and 15B for emitting light in the respective colors red, green, and blue. The light sources 15R, 15G, and 15B are mounted on the surface of a substrate 14 (see FIG. 4) and are aligned in a row at fixed intervals in a main scanning direction (a direction orthogonal to the surface of the drawings in FIGS. 2A and 2B). The light emitted from each light source is reflected off the surface of the original document being scanned and received by light-receiving elements 20 (see FIG. 4) in the sensor IC chips 2.

Next, the linear image sensor 21 will be described in detail with reference to FIGS. 4 and 5. As shown in FIG. 5, each sensor IC chip 2 includes phototransistors PT1-PTn of a prescribed number (for example, 1,728), field effect transistors FET1-FETn and a shift register 29. Each of the phototransistors PT1-PTn is configured of a light-receiving element 20. Upon receiving light, the phototransistors PT1-PTn store an electric charge corresponding to the amount of received light. When a start pulse SP described later is inputted into the sensor IC chip 2, the shift register 29 sequentially turns on the field effect transistors FET1-FETn in a fixed direction according to an inputted clock signal CLK described later. As a result, the electric charges stored in the phototransistors PT1-PTn are discharged in a fixed sequence. The basic circuit structure of the sensor IC chips 2 themselves is identical to the conventional sensor IC chips.

A plurality of the sensor IC chips 2 is mounted on the surface of the substrate 14 in a row extending in the same direction as the row of light-receiving elements 20. The multifunction device 1 according to the preferred embodiment is configured to support the reading of an A3-size document.

Figure 4:
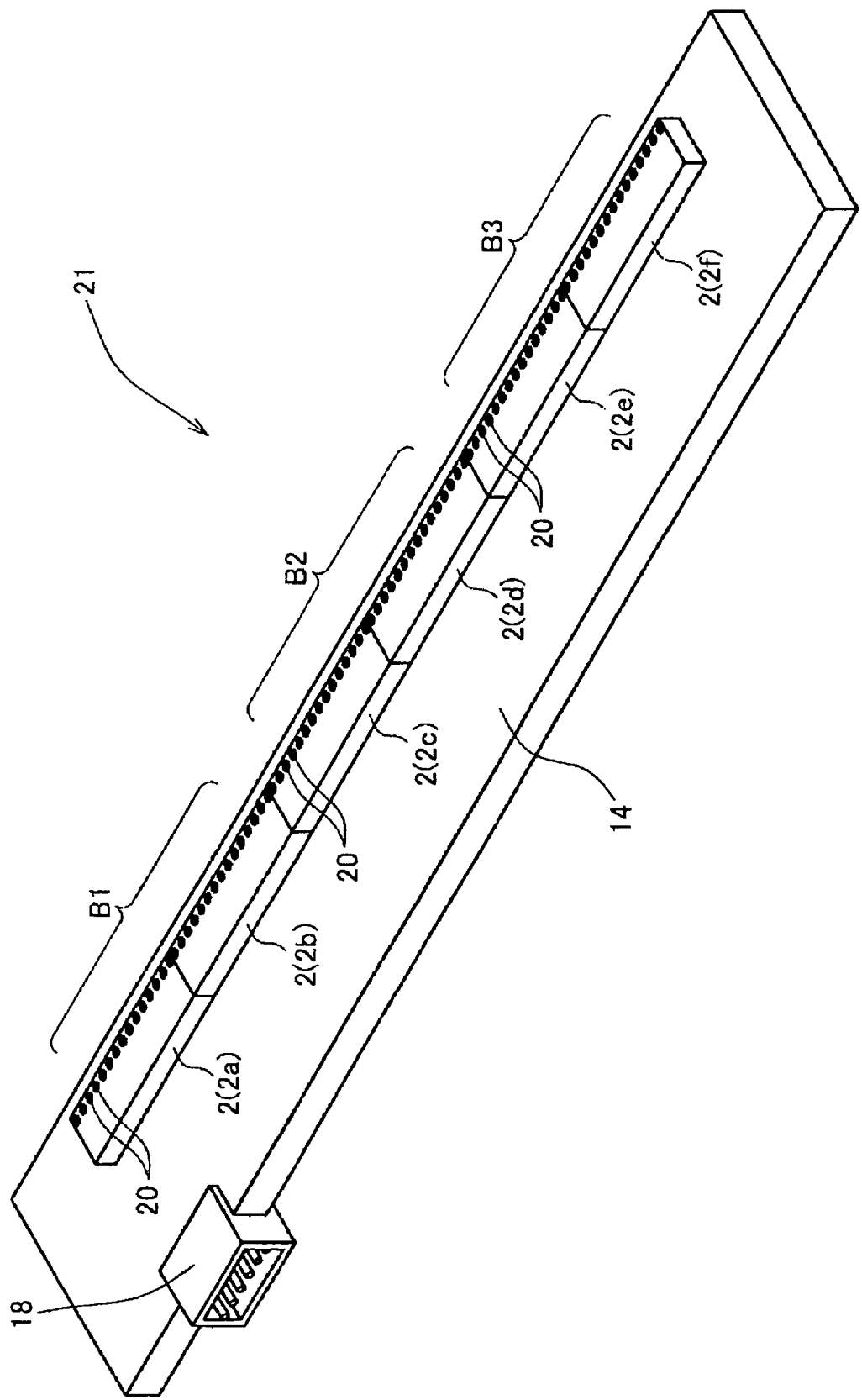
FIG. 4 is a perspective view of linear image sensors.
Figure 5:
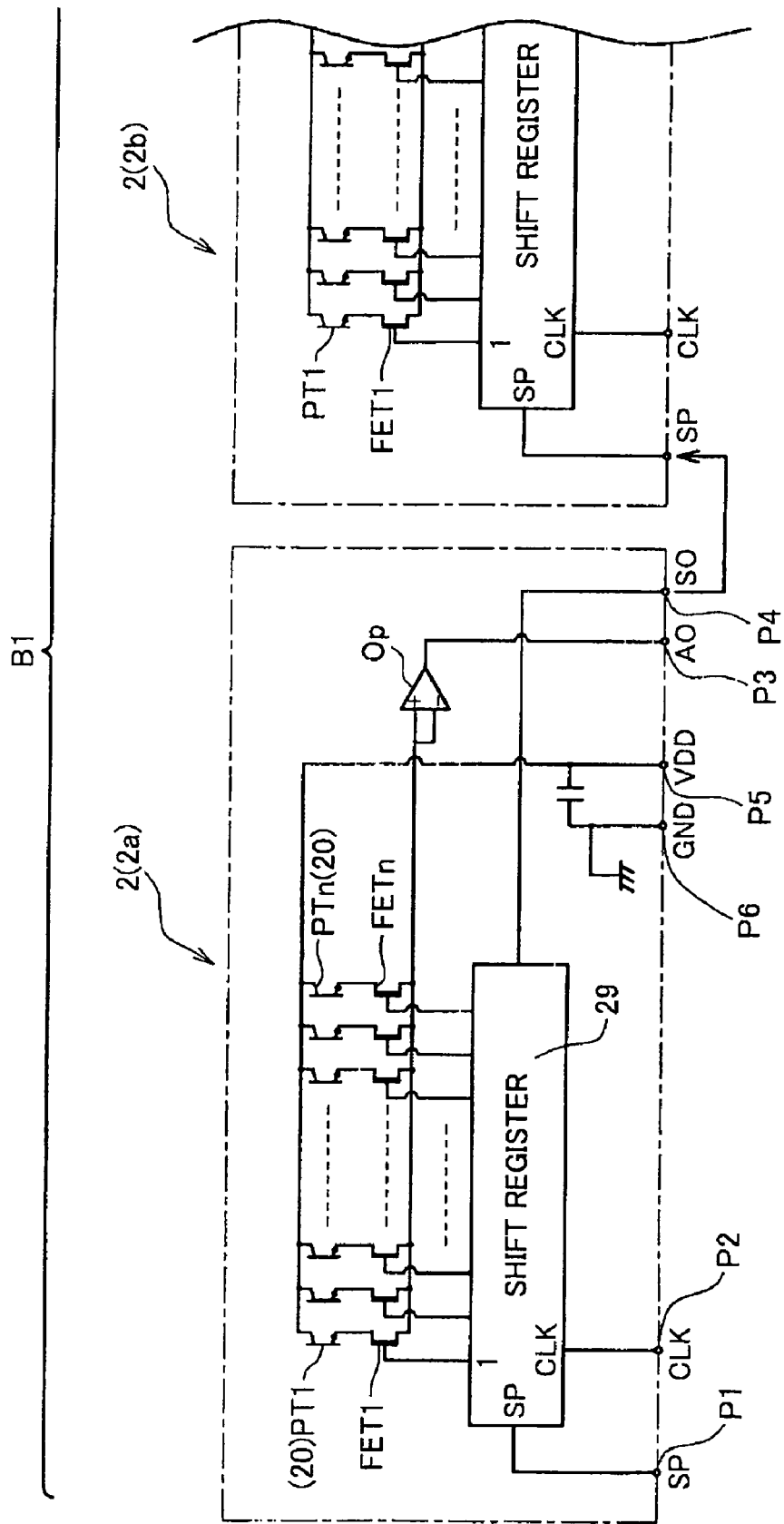
FIG. 5 is a circuit diagram showing a detailed structure of the linear image sensors.
Figure 7:
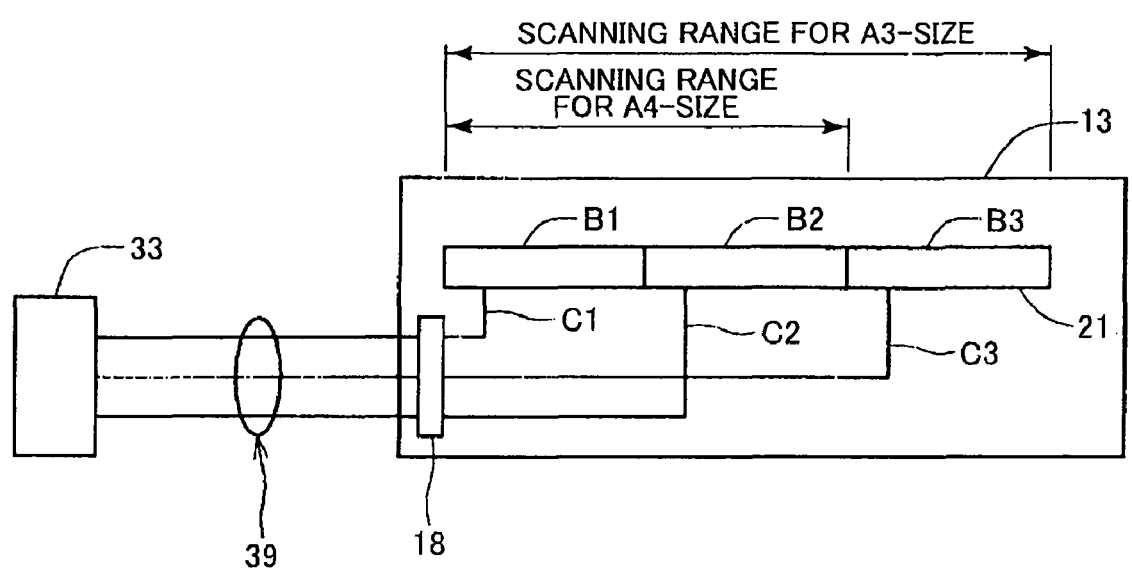
FIG. 7 is an explanatory diagram illustrating the structure of an image-reading device according to the present invention.

As shown in FIG. 4, six sensor IC chips 2 (2a-2f) are divided into unit blocks of two sensor IC chips 2 per block, making a total of three blocks B1 (IC chips 2a and 2b), B2 (IC chips 2c and 2d), and B3 (IC chips 2e and 2f) in order from one end to the other of the row. Wiring patterns C1-C3 are formed on the surface of the substrate 14, as shown in FIG. 7. One end of each wiring pattern leads to a connector 18 disposed on an edge of the substrate 14. A flexible flat cable 39 connected to the connector 18 enables the supply of power to the sensor IC chips 2 from a source external to the substrate 14 and enables input and output of various signals with the sensor IC chips 2. The other end of the flexible flat cable 39 is connected to the main circuit board 28, and the flexible flat cable 39 has sufficient length to follow the reading unit 13 in its range of movement. The wiring patterns C1-C3 are formed on the substrate 14 at positions or in a shape capable of preventing cross talk therebetween.

The flexible flat cable 39 is a thin tape-like cable well known in the art having a plurality of plate-shaped conductors arranged parallel to each other and covered with polyester tape, for example.

The number of blocks and the number of sensor IC chips provided per unit block are not particularly limited and are set to determine the size of sheet that can be read by the multifunction device 1 and the reading resolution of the multifunction device 1.

Of the three blocks B1-B3, two block B1 and B2 are used for reading an A4-size original, while all blocks B1-B3 are used for reading an A3-size document.

As shown in FIG. 7, the wiring patterns C1-C3 are arranged such that the wiring pattern C3 passes between the wiring patterns C1 and C2 in order to prevent cross talk from occurring between adjacent blocks B1 and B2, that is, between the wiring patterns C1 and C2. In other words, the wiring patterns C1-C3 are arranged such that the connecting points of the wiring patterns C1 and C2 with the flexible flat cable 39 are not adjacent to each other. As an alternative, the flexible flat cable 39 may be directly attached to the substrate 14 instead of passing through the connector 18.

Figure 6:
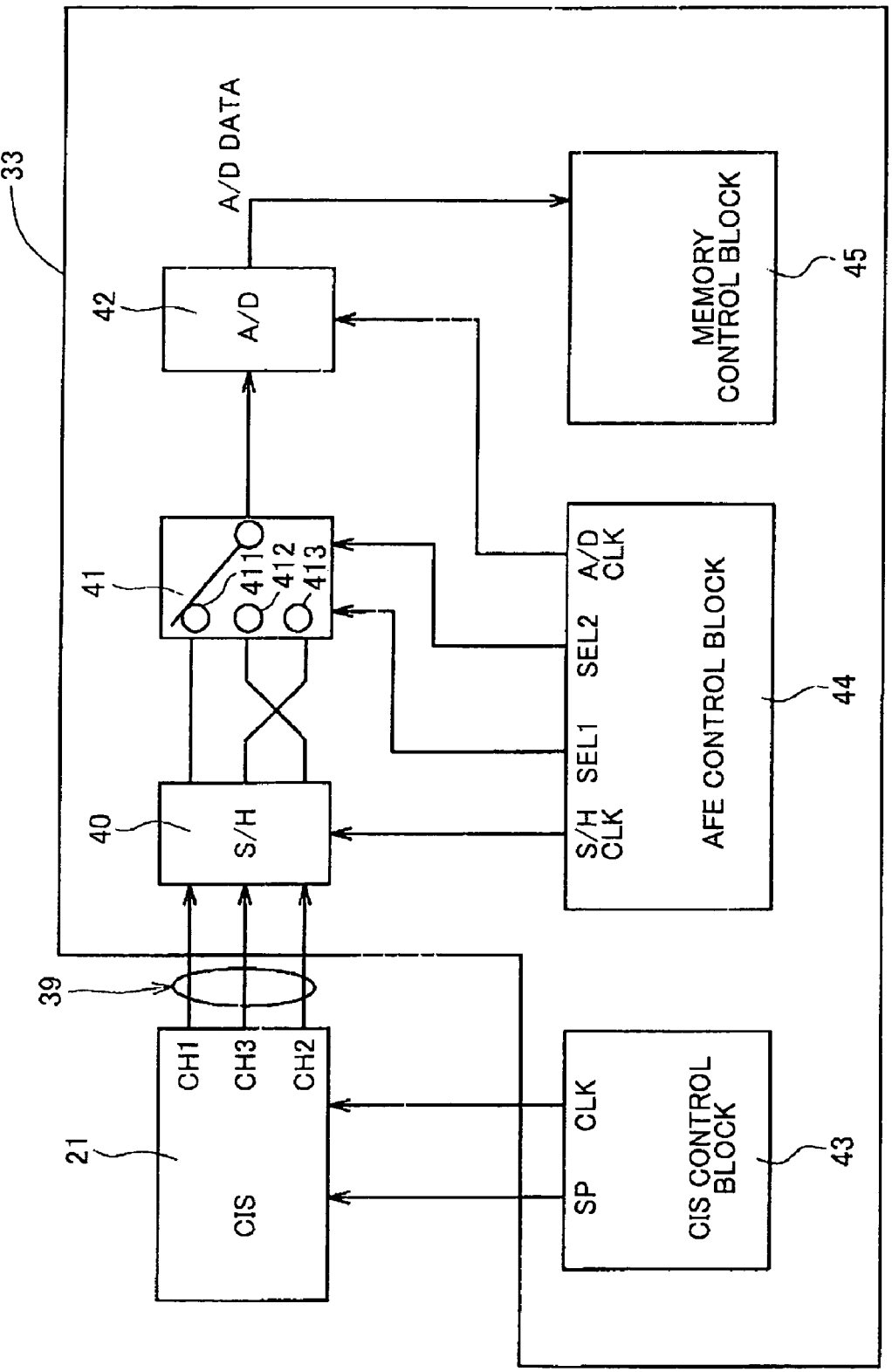
FIG. 6 is a block diagram showing the signal flow from the linear image sensors.

As shown in FIG. 6, the gate array 33 includes a control image sensor (CIS) control block 43 for supplying a start pulse SP, a clock signal CLK, and the like to the linear image sensor 21 under the overall control of the CPU 30; an analog front end (AFE) circuit configured of a sample hold (S/H) circuit 40, a multiplexer 41, and an analog/digital (A/D) converter 42; an AFE control block 44 for transmitting various control signals to the AFE circuit; and a memory control block 45 for sampling digital signals outputted from the A/D converter 42 and sequentially writing data based on these signals to a prescribed region in an image memory provided in the RAM 31. The control image sensor (CIS) in the CIS control block 43 is another name for the linear image sensor 21.

The AFE control block 44 functions to transmit a clock signal S/H CLK to the S/H circuit 40 for setting a sample/hold timing; to transmit selection signals SEL1 and SEL2 to the multiplexer 41 for selecting which of the signals outputted from the linear image sensor 21 along the channels CH1-CH3 to be inputted into the A/D converter 42; and to transmit a clock signal A/D CLK to the A/D converter 42 for setting the timing for analog/digital conversion.

The start pulse SP is divided and inputted into the three sensor IC chips 2a, 2c, and 2e positioned on the left in the three blocks B1-B3. As shown in FIG. 5, a serial out signal SO is outputted to the right sensor IC chip 2b of the block B1, for example, from a terminal P4 on the left sensor IC chip 2a. This serial out signal SO is inputted as a start pulse SP to begin driving the sensor IC chip 2b. The sensor IC chips 2 in the other blocks B2 and B3 are similarly configured. After driving the sensor IC chips 2a, 2c, and 2e positioned on the left in the respective blocks B1-B3, the right sensor IC chips 2b, 2d, and 2f are then driven. The clock signal CLK transmitted from the gate array 33 is divided and inputted into the six sensor IC chips 2a-2f.

When the user operates the control panel 23 to initiate the process for reading an original, the start pulse SP outputted from the gate array 33 is inputted into a terminal P1, at which time the shift register 29 sequentially turns on the plurality of field effect transistors FET1-FETn in a fixed direction according to the clock signal CLK inputted to a terminal P2. As a result, electric charges stored in the phototransistors PT1-PTn are discharged in a fixed sequence. The electric charges are amplified by an amplifier Op and outputted from a terminal P3 as a serial image signal AO. The image signal AO is an analog signal. The sensor IC chip 2 also includes the terminal P4 for outputting the serial out signal SO when the final image signal from the phototransistor PTn has been outputted. Further, the sensor IC chips 2 includes a terminal P5 for supplying a voltage VDD as required power for operating the components in the sensor IC chips 2, and a terminal P6 connected to ground GND.

When the start pulse SP is inputted into the terminal P1 of the sensor IC chip 2a in the block B1, for example, the image signal AO is outputted from the terminal P3 onto the channel CH1 based on the clock signal CLK. After the FETn is turned on by the clock signal CLK, that is, after the sensor IC chip 2a has outputted the image signal AO, the serial out signal SO is outputted and is inputted into the sensor IC chip 2b as a start pulse SP. The image signal from the sensor IC chip 2b is also outputted on the channel CH1.

As shown in FIG. 6, each analog read signal outputted from the channels CH1-CH3 for the respective blocks B1-B3 of the linear image sensor 21 is transmitted to the AFE circuit in the gate array 33 via the flexible flat cable 39 and is temporarily held in the S/H circuit 40 until each signal has been stabilized at a prescribed output level. Subsequently, the analog read signals are converted to digital signals based on commands from the AFE control block 44.

The multiplexer 41 has three inputs 411, 412, and 413 for receiving signals on the channels CH1, CH2, and Ch3 respectively. However, since the channels CH1, CH2, and CH3 are arranged in the order CH1, CH2, and CH3 on the flexible flat cable 39, the inputs 412 and 413 cannot receive signals from the channels CH2 and Ch3 respectively. In the present embodiment, the wires are configured so that the signals from the channels CH2 and CH3 are inputted into the inputs 412 and 413 respectively after outputted from the S/H circuit 40. In this way, when the selection signals SEL1 and SEL2 are inputted into the multiplexer 41 so as to turn ON the inputs 411, 412, and 413 in the stated order, for example, the image signals will be inputted into the A/D converter 42 in the order CH1, CH2, and CH3. Therefore, this configuration prevents read image data from being stored incorrectly in the image memory, or prevents the image data from being outputted incorrectly.

As an alternate method to the method described above, inputs 411, 412, and 413 may receive signals from the channels CH1, CH3, and CH2 respectively. In such a case, the selection signals SEL1 and SEL2 are inputted into the multiplexer 41 so as to turn ON the inputs 411, 412, and 413 in the order 411 (CH1), 413 (CH2), and 412 (CH3). In this way, the image signals can be converted to digital data by the A/D converter 42 and stored in the image memory in the correct order.

Thus, the multifunction device 1 can reduce the effects of cross talk is achieved by allocating signal wires for adjacent blocks so as not to be adjacent to each other in the flexible flat cable 39.

The multifunction device 1 can also eliminate the need for shielded wire that can increase the weight and limit the movement of the flexible flat cable 39 and that can increase the cost of the multifunction device 1.

When the blocks B1 and B2 are used to read an A4-size image, for example, the wiring patterns C1 and C2 are not adjacent to each other in the flexible flat cable 39. Accordingly, the multifunction device 1 can prevent the occurrence of cross talk.

If analog signals read with a linear image sensors are converted into digital signals before outputted to a flexible flat cable, it is possible to eliminate the effects of cross talk should cross talk occur. However, this construction requires that an A/D converter is disposed near the linear image sensors, leading to a more complex circuit structure around the linear image sensors and increasing the size and weight of the section in which the linear image sensors are provided. Further, since an A/D converter is often included in a controller of an image-reading device, providing another of such circuits near the linear image sensors may lead to an increase in production costs.

However, in the multifunction device 1, the linear image sensors 21 can transmit analog image signals to the controller of the multifunction device 1 without the occurrence of cross talk. Therefore, there is no need to provide the A/D converter 42 near the linear image sensors 21, thereby avoiding an increase in production costs.

Although large-scale multifunction devices require a longer flexible flat cable that is more susceptible to the occurrence of cross talk, the multifunction device 1 can reduce the occurrence of cross talk regardless of the cable length.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. An image-reading device comprising:
  a linear image sensor divided into, at least, first, second and third blocks, the first block being disposed adjacent to the second block, each block reading images on an original document and generating image signals; and
  a cable having a length and including, at least, first, second and third signal wires corresponding to the first, second and third blocks respectively, each signal wire transmitting the image signals generated by each block, wherein the third wire is sandwiched between the first signal wire and the second signal wire for the entire length of the cable.

2. The image-reading device according to claim 1, further comprising an A/D converter that converts the image signals transmitted by each signal wire to digital signals, wherein the image signal is in an analog form.

3. The image-reading device according to claim 2, further comprising an outputting unit that outputs the image signals transmitted by the first, second and third signal wires to the A/D converter in a predetermined order.

4. The image-reading device according to claim 3, further comprising a controller that controls the outputting unit, wherein the outputting unit includes a multiplexer that selects the image signal to be outputted to the A/D converter, wherein the controller controls the multiplexer so that the image signals transmitted by the first, second and third signal wires are outputted to the A/D converter in a preselected order.

5. The image-reading device according to claim 1, further comprising a substrate on which the linear image sensor is mounted, the substrate including a cable connecting portion to which the cable is connected, first, second and third wiring patterns being formed on the substrate, the first wiring pattern transmitting the image signals generated by the first block to the first signal wire when the cable is connected to the cable connecting portion, the second wiring pattern transmitting the image signals generated by the second block to the second signal wire when the cable is connected to the cable connecting portion, the third wiring pattern transmitting the image signals generated by the third block to the third signal wire when the cable is connected to the cable connecting portion, wherein at least one part of the third wiring pattern is sandwiched between the first wiring pattern and the second wiring pattern.

6. The image-reading device according to claim 1, wherein the first, second and third signal wires are fixedly arranged in a side-by-side fashion.

7. The image-reading device according to claim 6, wherein the cable is flat.

8. The image-reading device according to claim 1, wherein the cable is flexible.

9. The image-reading device according to claim 1, wherein the first, second and third blocks are disposed in a stated order, wherein the first, second and third blocks correspond to width of A3-size original document, while the first and second blocks correspond to width of A4-size original document.

* * * * *